United States Patent [19]
Katsumata

[11] Patent Number: 5,486,105
[45] Date of Patent: Jan. 23, 1996

[54] APPARATUS FOR CONTROLLING A HEATING TEMPERATURE

[75] Inventor: Hirofumi Katsumata, Numazu, Japan

[73] Assignee: Toshiba Kikai Kabushiki Kaisha, Tokyo, Japan

[21] Appl. No.: 165,472

[22] Filed: Dec. 13, 1993

[30] Foreign Application Priority Data

Dec. 14, 1992 [JP] Japan ................... 4-332755

[51] Int. Cl.$^6$ ................... B29C 45/78
[52] U.S. Cl. ........... 425/143; 264/40.6; 425/144
[58] Field of Search ................... 425/143, 144; 264/40.6

[56] References Cited

U.S. PATENT DOCUMENTS

4,365,946 12/1982 Anders ................... 425/144

Primary Examiner—Tim Heitbrink
Attorney, Agent, or Firm—Cushman Darby & Cushman

[57] ABSTRACT

An apparatus for controlling a heating temperature which does not need to memorize compensation data preliminary but promptly corresponds to the temperature fluctuation in accordance with the running condition to thereby control the temperature accurately and stably. The control device 10 controls a heating state of the heater 4 corresponding to setting and a running state of the injection mold machine 1 heated by the heater 4. The injection mold machine 1 is adapted to run as expected and the temperature of which is maintained at a predetermined value by the heater 4. The mean value calculation and memory portion 20 functions to calculate a mean value of control inputs throughout a certain operating state. When the setting of the control device 10 is altered, the injection mold machine 1 requires another heating condition due to a change of operating state thereof. Two of the mean values corresponding to the alteration are selected and used in a certain calculation, so that the calculated result as compensating input is added to the control input.

11 Claims, 7 Drawing Sheets

APPARATUS FOR CONTROLLING A HEATING TEMPERATURE

BACKGROUND OF THE INVENTION

1. FIELD OF THE INVENTION

This invention is broadly concerned with an apparatus for controlling a heating temperature and intended particularly to be used to heat resin under various conditions in an injection mold machine or an extruder.

2. DESCRIPTION OF THE RELATED ART

Conventionally, a heating device is employed in an injection mold machine, an extruder, or the like for melting a resin material. An electric heater is generally used as a typical heating means and is accurately controlled depending upon the type of resin and a molding condition.

Figure 4:
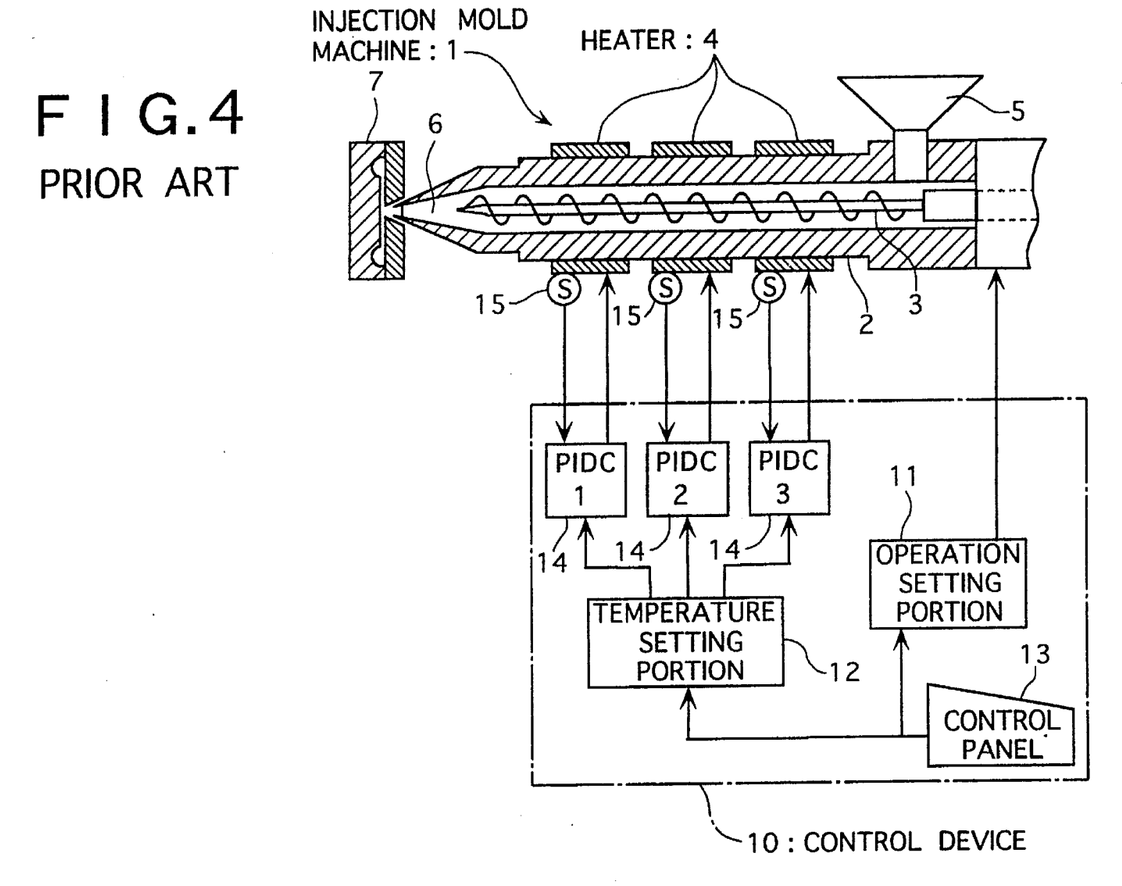
FIG. 4 is a block diagram entirely showing a conventional construction with reference to the present invention.

One example is schematically illustrated in FIG. 4. An injection mold machine 1 consists of a barrel 2, a screw 3 disposed inside the barrel 2 such that its axle axis is aligned with that of the barrel 2, and an electric band heater 4 on the peripheral surface of the barrel 2. In the operation of the machine 1, a pellet of resin material is put into a hopper 5 and transmitted through the barrel 2 while being heated and melted by the heater 4, and while being compressed and kneaded by the screw 3. The molten materials thus extruded from a nozzle 6 of the barrel 2 and subsequently injected into a die 7 to be molded.

Such an injection mold machine 1 is controlled by a control device 10. The control device 10 functions to synthetically control the rotation of the screw 3 and the temperature of the heater 4. The device 10 includes an operation setting portion 11 and a temperature setting portion 12, for presetting a certain state of the injection mold machine 1, and a control panel 13 for manual control by an operator.

The temperature setting portion is connected with PID controllers 14 to regulate the electric power for heaters 4 and with sensors 15 to detect a real temperature for the barrel 2.

Figure 5:
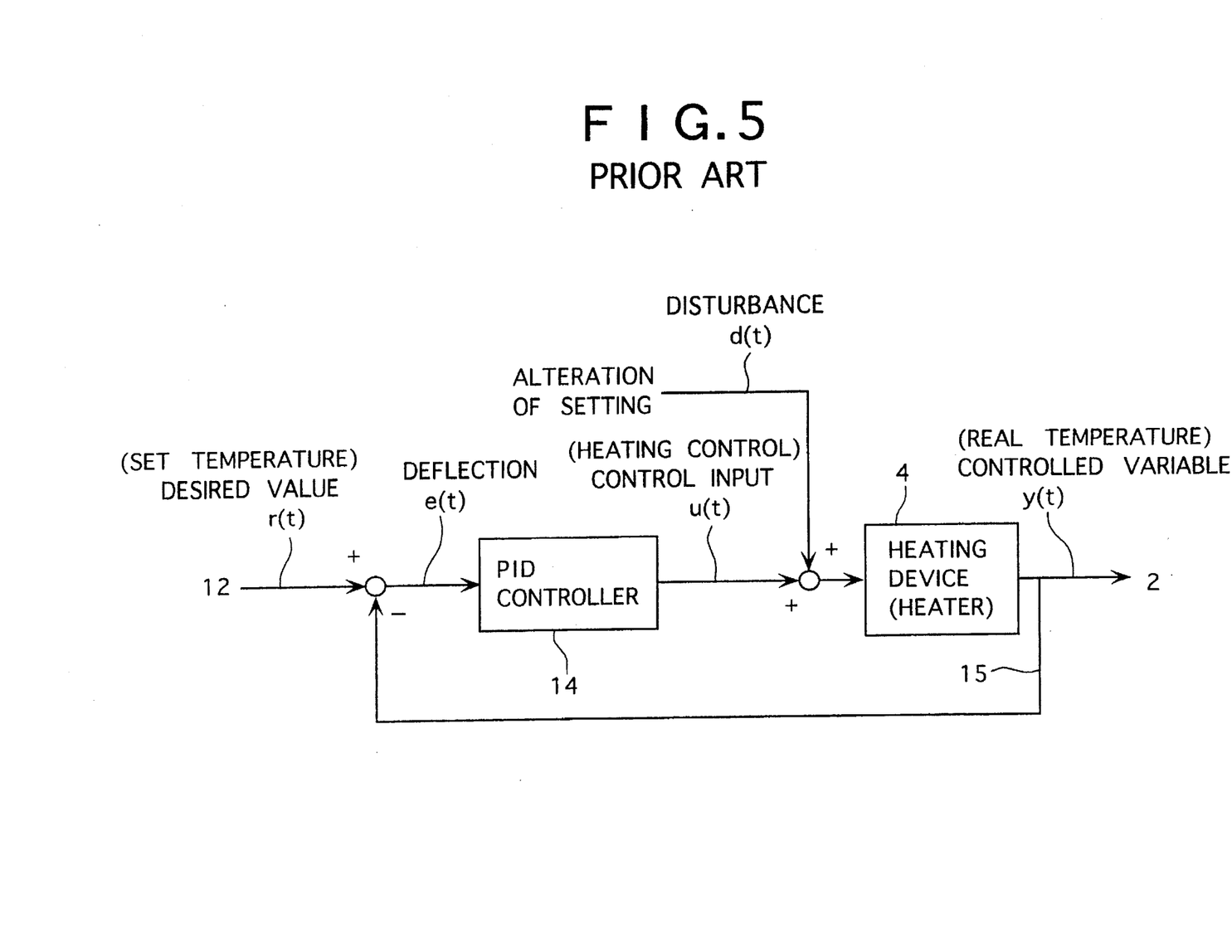
FIG. 5 is a block diagram showing how the conventional apparatus is controlled.

Temperature control by the control device 10 can be schematically described by the block diagram shown in FIG. 5. In the drawing, r(t) is a desired set temperature of the temperature setting portion 12, and control input u(t) is a heating control from the PID controller 14 to the heater 4. Controlled variable y(t) is the real temperature of the barrel 2 based on the heating control and varies with the barrel 2 in accordance with the object to be heated and sorts of resin materials fed into the barrel 2. The real temperature of the barrel 2 detected by the sensor 15 is negatively fed back to an input of the PID controller 14, thereby enabling feedback control to be carried out so as to decrease a deflection e(t) of a set temperature and real temperature. Accordingly, the barrel 2 is set at a predetermined set temperature by the heater 4.

The conventional apparatus shown in FIG. 4 has three lines each consisting of the heater 4, the sensor 15, and the controller 14 toward three portions of the barrel 2; a base portion, a middle portion, and a forward portion. These lines are respectively controlled at a certain set temperature by the temperature setting portion 12 to conduct a zone control of the barrel 2.

It is known that if the temperature of a resin material is low, its moldability is likely to decline, and if it is high, decomposition may result. Hence, temperature control of the barrel 2 is necessary for executing a desirable molding with reduced temperature fluctuation.

However, the conventional injection mold machine 1 can not prevent a delay of the temperature control in response to some alterations of conditions when molding. Since feedback control such as the PID control is employed for the control device 10, the heating control for the heater 4 is always done after detecting some change of the temperature of the barrel. The fluctuation of the temperature becomes rather severe due to the delay of the temperature control, so that the resin in the barrel 2 is not melted enough or decomposed due to excess heating.

Moreover, when changing the set temperature of the injection mold machine 1, or when changing the operating condition of the machine 1, a slight deviation of the real temperature of the barrel 2 is caused.

This is because while heating up the temperature of the barrel 2 with no resin material therein, the temperature is easily changed with a small quantity of heat. But, in an operation in which the resin fed into the barrel 2 is melted and not extruded, it is necessary to change the temperature to apply a greater quantity of heat to the barrel 2. In a molding cycle operation, in which the resin is continuously melted and extruded from the barrel 2, a large amount of heat is necessary to process the resin material successively fed into the barrel 2. Otherwise, the necessary quantity of heat can be changed depending upon an operation cycle of the machine 1.

Hence, when shifting the operation from the preparation step to the molding cycle operation, the necessary quantity of heat increases and the temperature of the barrel 2 decreases. During the molding cycle operation which needs a relatively large quantity of heat, the fluctuation of the temperature tends to be greater because of the delay of heating control, and faulty moldings are produced.

In FIG. 5, such a situation is shown as a disturbance d(t). It can be seen that the disturbance d(t), because of alterations of setting required when starting and stopping molding, causes temperature fluctuation.

Figure 6:
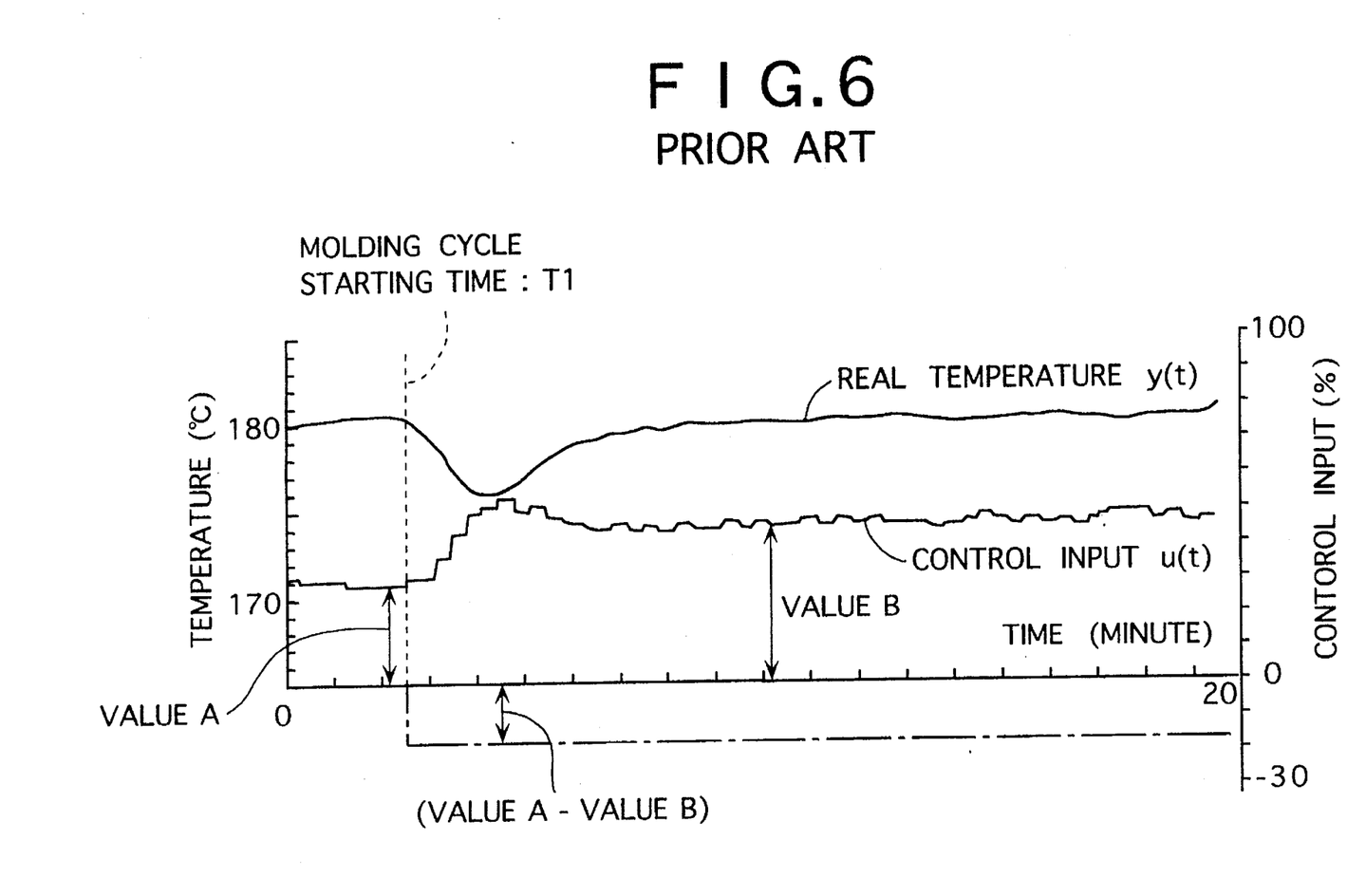
FIG. 6 is a graphical representation showing a control example based on the conventional apparatus at the beginning of the molding operation thereof.
Figure 7:
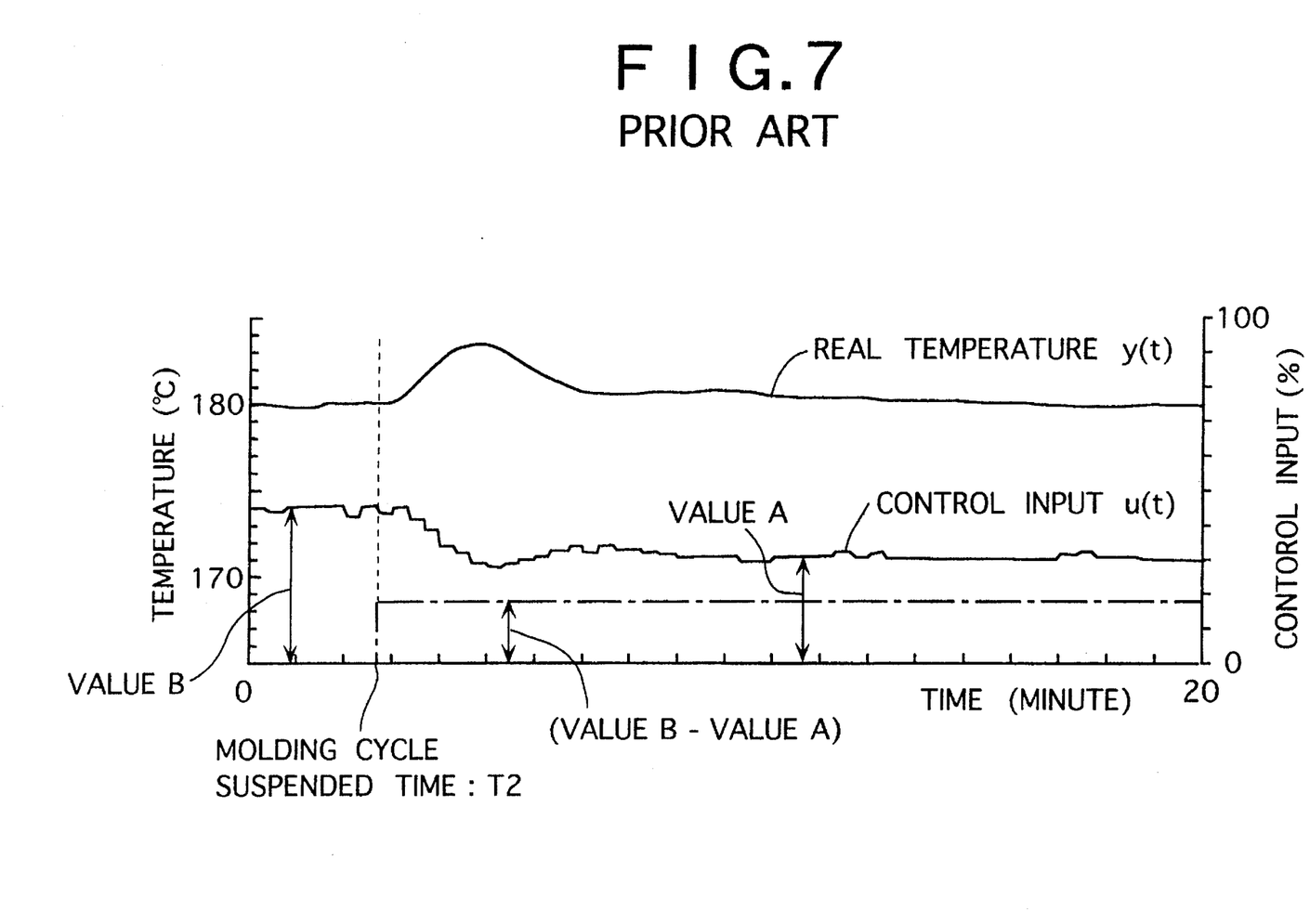
FIG. 7 is a graphical representation when the conventional apparatus is in a suspended state.

Some instances conducted by the conventional apparatus are shown in FIGS. 6 and 7. FIG. 6 is a graphical representation of temperature fluctuation at the time when the molding cycle operation begins at time T1 described by a dotted-line. Incidentally, the set temperature is, for example, 180 degrees. Before the beginning of the molding cycle, the control input (A) is enough to keep the well-balanced condition whereas, in the molding cycle, the control input (B) is required. It can be understood that the difference (A–B) is likely to equal to a stepping disturbance begun at the very moment described by a dotted-line in the drawing. The feedback control takes a long time to cure disturbance and the temperature fluctuation may result.

Referring now to FIG. 7, this is a graphical representation of temperature fluctuation when the molding cycle operation is suspended at the time T2 described by the dotted-line. The setting temperature is kept constant at for example 180 degrees. It is the other way around in this case, that is the value B can balance in the molding procedure whereas the value A can balance in the suspended state.

In order to settle these disadvantages, the Japanese Patent Laid-open No. 3-164224 has proposed another apparatus for controlling a heating temperature. The proposed apparatus is provided with a condition compensating means for adding a compensating input to a control input of heating means such as a heater.

However, it was observed that the compensating data should be preliminary memorized in a memory portion after some examples and various analysis which require a great deal of time for every operation condition.

The present invention aims to provide an apparatus for controlling a heating temperature which does not require to memorize compensating data preliminary and provides a prompt correspondence to temperature fluctuation upon operation states, thereby controlling the temperature accurately and stably.

SUMMARY OF THE INVENTION

An apparatus for controlling a heating temperature, according to the present invention has a control means for controlling states of an object to be heated in several operation states and a heating means for heating the object; a calculation means for calculating a mean value of control inputs sent from the control means to the heating means every operating states of the object; and a compensation means for adding to the control input a calculation result as compensating input resulting from a predetermined calculation using two values among the mean values of the control inputs processed in the calculation means.

According to the present invention, the control means controls a heating state of the heating means and a running state of the object in response to the setting state whereat the object is brought under control and maintained at a predetermined temperature by the heating means.

DETAILED DESCRIPTION OF THE PREFERRED EMBODIMENT(S)

The following description relates to a preferable embodiment of an apparatus for controlling a heating temperature according to the present invention.

Figure 1:
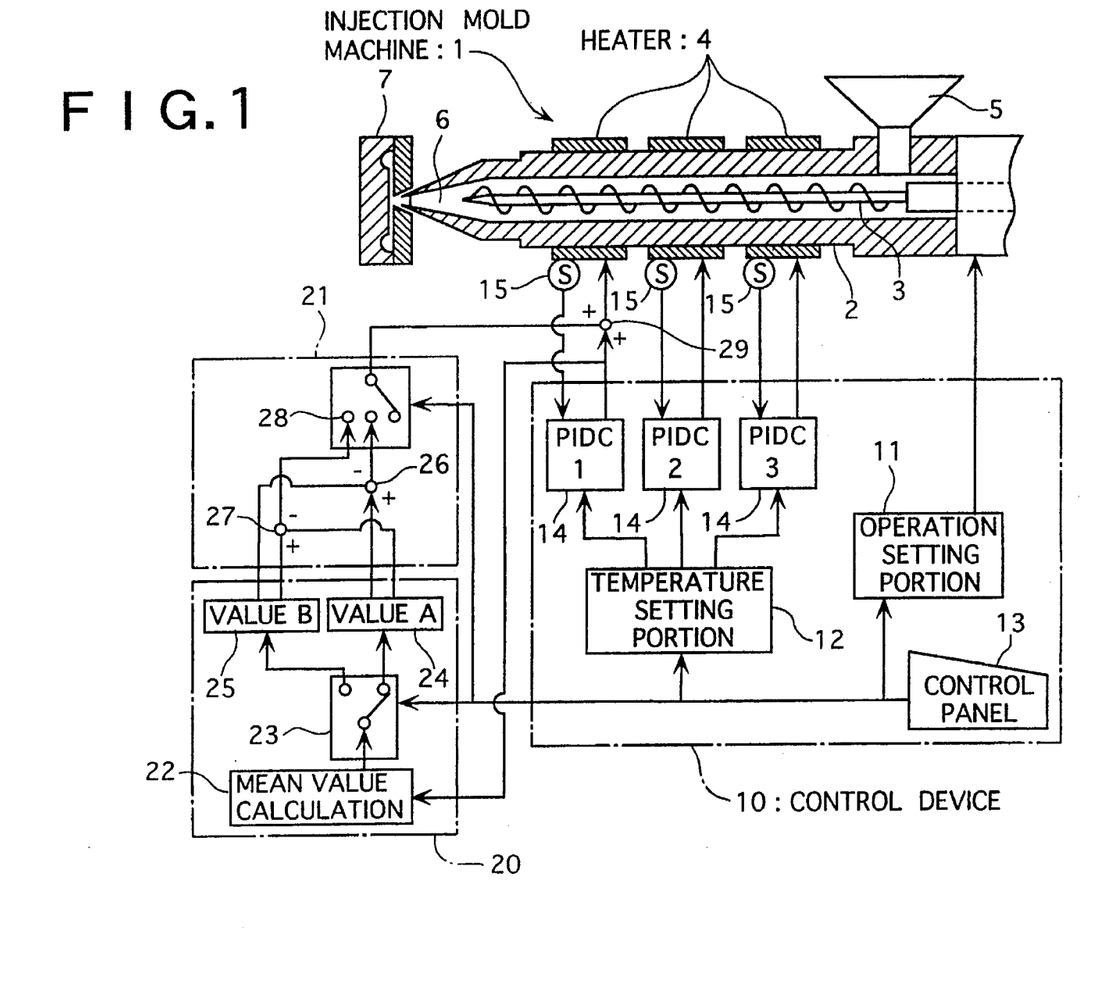
FIG. 1 is a block diagram showing an entire construction of a preferable embodiment according to the present invention.

An apparatus for controlling a heating temperature which is applied to an injection mold machine according to the present invention is schematically shown in FIG. 1. The injection mold machine is denoted by the numeral 1 as the object to be heated. Denoted by 4 is a heater as the heating device. Denoted by 10 is a control device to control these devices. In these devices, the injection mold machine 1 and the control device 10 are the same as that in FIG. 4. Incidentally, in the description of the following embodiment, the same reference numerals will be used to designate the same or similar components as those in the conventional example, so that description will be omitted or simplified.

The control device 10 is connected with a mean value calculation and memory portion 20 wherein a mean value of control input is calculated and then stored therein and is also connected with a condition compensating portion 21 wherein the difference between two optionally selected mean values held in the mean value calculation and memory portion 20 is added to the control input. Incidentally, the control device 10, the mean value calculation and memory portion 20 and the condition compensating portion 21 embodies a control means, a calculation means and a compensation means, respectively.

The mean value calculation and memory portion 20 functions to constantly pick the control input for certain cycles and calculates the mean value in a mean value calculation portion 22. The calculated mean values are stored either in a memory 24 or 25 through a changeover switch 23. The recommended calculation method is a running mean method wherein past data back from the present time are used to obtain the mean value. The injection molding machine 1 has two operation states, one being a molding suspended state containing a heat-up operation state thereof and the other being a molding state. In each operation state for the injection molding machine 1, the running mean is calculated and stored in the memory 24 or 25.

When beginning a molding operation of the machine 1, the barrel is heated at until a predetermined temperature and the running mean value of the control input is memorized as a value A in the memory 24. The temperature of the barrel is so understood that it will become stable at the predetermined value and the control input is also kept constant if a preferable feed-back control system is established. The value A in the memory 24 is successively renewed by obtaining the control input from the running mean values.

The temperature of the barrel fluctuates upon a quantity of heat required to hold the setting temperature through the molding process in the injection molding machine 1. The control input is corrected by means of the feed-back control system to prevent such a temperature fluctuation to settle down the setting temperature whereat the control input is balanced at a certain level. This control input is also calculated based on the running mean value and is stored in the memory 25 as a value B.

Under the molding suspended state, the mean value calculation and memory portion 20 and the condition compensating portion 21 are operated in response to an input to the control panel 13 to calculate the difference between the values A and B in a first subtracter 26 in the condition compensating portion 21. The result is added to the control input of the feedback-loop. In this particular embodiment, the result in the first subtracter 26 is sent to an adder 29 via a changeover switch 28. The adder 29 calculates a proper value to be added to the control input issued from the PID controller 14 controlling the heaters 4 secured at the forward surface on the barrel 2.

As can be understood from the above explanations, as adding the result in the first subtracter 26 to the control input of the feedback-loop, the disturbance can be cancelled in good time to make the necessary time to stabilize the control input short effectively compared with that done by the feedback control only whereat the fluctuation of temperature can be minimized.

Figure 3:
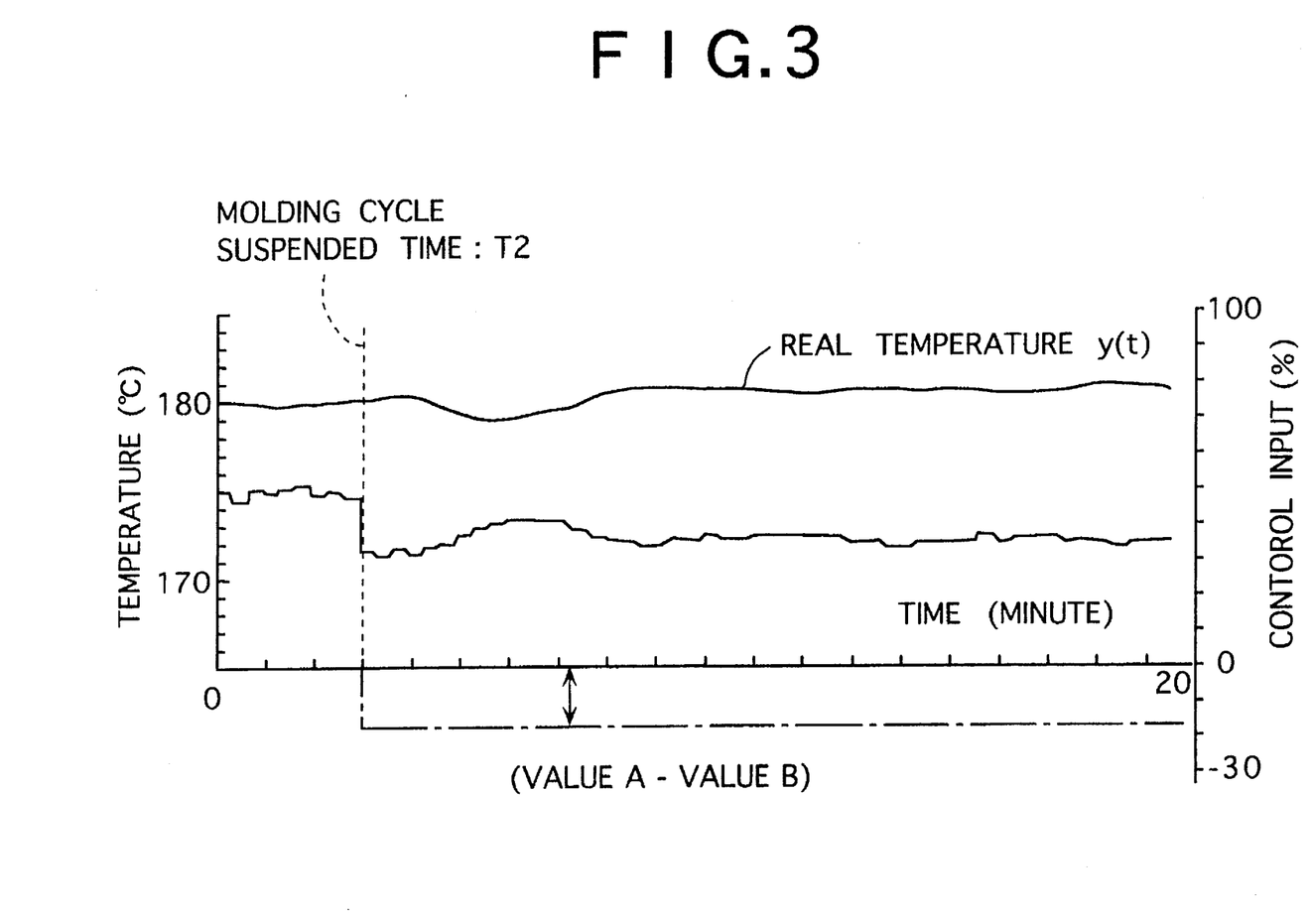
FIG. 3 is a graphical representation when the apparatus is in a suspended state.

FIG. 3 is a graphical representation supporting the above to add (Value A–Value B) to the control input at the same time when the molding process is suspended. The value of (Value A–Value B) adding to the control input is depicted by a dashed-line in the drawing in an opposite state to that shown in FIG. 7 as the prior art so as to cancel the disturbance to thereby cut down the temperature fluctuation.

If it is required to resume the molding process, another calculation to subtract the value A from the value B is conducted in a second subtracter 27 in the condition compensating portion 21. The calculated result is added to the control input of the feedback-loop. In this particular embodiment, the result in the second subtracter 27 is sent to an adder 29 via a changeover switch 28. The adder 29 calculates a proper value to be added to the control input issued from the PID controller 14 controlling the heaters 4 secured at the forward surface on the barrel 2 whereat the same result as mentioned above can be obtained.

Figure 2:
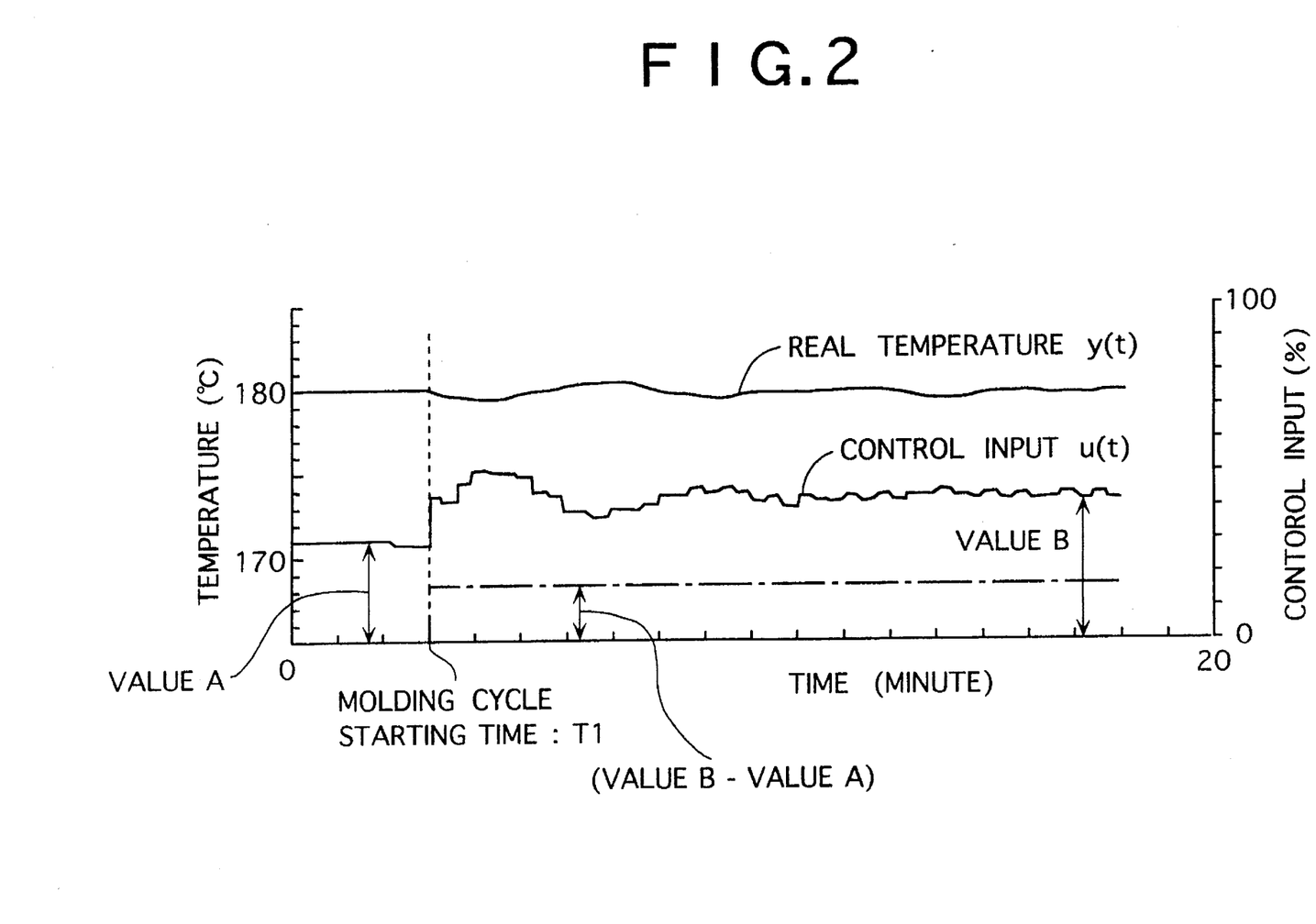
FIG. 2 is a graphical representation when operating the apparatus in FIG. 1.

It is believed that since the values A and B are memorized, when intending to operate the machine 1 under the same conditions mentioned before the temperature fluctuation can be prevented from at the beginning of the molding operation. FIG. 2 is a graphical representation supporting the above to add (Value B−Value A) to the control input at the same time when the molding process is suspended. The value of (Value B−Value A) adding to the control input is depicted by a dashed-line in the drawing in an opposite state to that shown in FIG. 6 as the prior art so as to cancel the disturbance to thereby cut down the temperature fluctuation.

It is to be understood that the present invention is not intended to be limited to the above-described embodiments, and various changes may be made therein without departing from the spirit of the present invention. Such changes are also included in the scope of the present invention.

The object to be heated, the heating means, the control means are not limited to the injection molding machine 1, the heater 4 and the control device 10 but to another injection molding machine or extruder, a general heating device and a standard control device, respectively. In the above explanations, one-to-one combination of the PID controller 14 and the corresponding heater 4 provided at the forward portion of the barrel 2 is only considered but it is believed natural to be able to apply the present invention to all three controllers 14 depicted in the FIG. 1. As has been mentioned that the difference of the mean value is directly added as the compensation input but it can be used in an operation that a constant is multiplied upon an operation condition.

The control panel 13 is not always necessary when providing a pressure sensor in the barrel 2 to detect whether the materials are fed into the barrel or not. When intending to run the machine 1 automatically by using a timer, taking advantage of a signal from the timer may be utilized.

Even if the machine has more than two states, the present invention can be applied thereto by calculating and storing the mean value in the same way so as to select two values upon conditions.

As has been mentioned above, the present invention for the apparatus for controlling a heating temperature does not need to memorize compensation data preliminary but promptly corresponds to the temperature fluctuation in accordance with the running condition to thereby control the temperature accurately and stably.

What is claimed is:

1. An apparatus for controlling a heating temperature of an object being heated, the object having several operation states, said apparatus comprising:

control means for controlling heating of the object while in one of said several operation states;

heating means for heating the object;

calculation means for calculating a mean value of control inputs sent from said control means to the heating means during every state of said several operation states; and compensation means for adding to the control input a calculation result as compensating input resulting from a predetermined calculation using two values among the mean values of the control inputs processed in said calculation means, wherein the mean values calculated by said calculation means are successively stored for every state of said several operation states, and wherein the mean values are selected by said compensation means corresponding to an operation state of the object before and after alteration thereof.

2. The apparatus for controlling a heating temperature according to claim 1, wherein said control means comprises:

an operation setting portion controlling the operation states of the object, a temperature setting portion presetting an objective temperature of the object, a temperature controller outputting a control input to the heating means based on the objective temperature settled in the temperature setting portion, and a control panel externally controlled by an operator to change an operating state.

3. The apparatus for controlling a heating temperature according to claim 2, wherein the temperature controller includes a temperature sensor detecting an actual temperature of the object to be heated.

4. The apparatus for controlling a heating temperature according to claim 3, wherein the temperature controller is a PID controller being adapted to carry out a feedback control for the object in accordance with the actual temperature detected by the temperature sensor.

5. The apparatus for controlling a heating temperature according to claim 1, wherein the mean value of control inputs is calculated by a running mean method wherein past data back from the present time are used.

6. The apparatus for controlling a heating temperature according to claim 1, wherein said calculation means includes a mean value calculation portion calculating a mean value of said control inputs sent from said control means to the heating means and a memory storing the mean value calculated in the mean value calculation potion every state of said several operation states of the object.

7. The apparatus for controlling a heating temperature according to claim 1, wherein said compensation means adds to the control input, as a compensating input, a difference between two optionally selected mean values held in said calculation means before and after an alteration of an operation state of the object.

8. The apparatus for controlling a heating temperature according to claim 7, wherein said compensation means includes:

a plurality of subtracters calculating the difference between two mean values corresponding to two operation states of said several operation states among those mean values which are obtained in said calculation means, a changeover switch selecting the subtracter corresponding to two operation states before and after the alteration and issuing the difference calculated in the subtracter, and an adder adding the difference from the changeover switch to the control input as compensating input.

9. An apparatus for controlling a heating temperature of an object being heated, the object having several operation states, said apparatus comprising:

heating means for heating the object;

control means including an operation setting portion controlling heating of the object in said several operation states, a temperature setting portion presetting an objective temperature of the object, a temperature controller outputting a control input to the heating means based on the objective temperature, and a control panel externally controlled by an operator to change an operation state of said object to one of said several operation states;

mean value calculation and memory portion means including a mean value calculation portion calculating the mean value of control inputs from the temperature controller to the heating means, a plurality of memories storing the mean values calculated in the mean value calculation portion for every operation state of the object, and a changeover switch inputting outputs from the mean value calculation portion to any one of plural memories corresponding to signals for changing of operation states from the control panel; and a condition compensating means including a plurality of subtracters calculating a difference between two mean values corresponding to two operation states among those mean values which are obtained in said calculation means, a changeover switch selecting the subtracter corresponding to two running states before and after an alteration of said operation states and issuing the difference calculated in the sabtracter, and an adder adding the difference issued from the changeover switch to the control input as compensating input.

10. An apparatus for controlling a heating temperature of an object being heated, the object having several operation states, said apparatus comprising:

a control portion including an operation setting portion controlling a resin molding portion of a mold machine operated either in a molding state or a suspended state, a temperature setting portion setting an objective temperature of a heater provided to heat the resin molding portion, a temperature controller outputting a preferable control input to the heater based on the objective temperature set in the temperature setting portion, and a control panel externally controlled by an operator to change an operating state:

mean value calculation and memory portion means including a mean value calculation portion calculating the mean value of control inputs from the temperature controller, two memories storing the mean values calculated in the mean value calculation portion for every operating state of the object, and a changeover switch inputting outputs from the mean value calculation portion to one of two memories corresponding to signals for changing of operating states from the control panel; and condition compensating means including a first subtracter calculating the difference between two mean values corresponding to two operating states among those which are obtained in said calculation means, a changeover switch selecting the subtracter corresponding to two running states before and after the alteration and issuing the difference calculated in the sabtracter, and an adder adding the difference from the changeover switch to the control input as compensating input.

11. An apparatus for controlling a heating temperature according to claim 10, wherein the mold machine is an injection mold machine, wherein the resin molding portion is a barrel receiving therein a screw, wherein the heater is separately provided into three portions of a base portion, a middle portion and a forward portion, and wherein said mean value calculation and memory portion and said condition compensating means are respectively provided for three heaters.

* * * * *